UNITED STATES PATENT OFFICE.

BENNO HOMOLKA, OF FRANKFORT-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION.

INDIGO MIXTURE AND PROCESS OF MAKING SAME.

SPECIFICATION forming part of Letters Patent No. 726,688, dated April 28, 1903.

Application filed October 28, 1902. Serial No. 129,096. (Specimens.)

*To all whom it may concern:*

Be it known that I, BENNO HOMOLKA, Ph. D., a citizen of the Empire of Germany, residing at Frankfort-on-the-Main, Germany, have invented certain new and useful Improvements in the Manufacture of Products Soluble in Water from Ortho-Nitrophenyl-Beta-Lactic Acid Methyl Ketone or its Homologues, of which the following is a specification.

It is known that by condensing ortho-nitrobenzaldehyde with acetone in the presence of small quantities of dilute alkalies ortho-nitrophenyl-beta-lactic acid methyl ketone is obtained, which on treatment with an excess of alkali yields indigo. This formation of indigo seemed more than any other to be specially suited for the manufacture of the dyestuff on the fiber. However, experiments made hitherto in this respect failed because the ortho-nitrophenyl lactic acid methyl ketone is soluble with difficulty in water. Experiments have been made to produce a compound of ortho-nitrophenyl-beta-lactic acid methyl ketone soluble in water. A temporary success in this direction was the sodium bisulfite compound of ortho-nitrophenyl-beta-lactic acid methyl ketone, which is readily soluble in water. This, however, has not maintained its place in industry on account of its instability and lack of fastness to light.

This invention relates to the manufacture of soluble products from ortho-nitrophenyl-beta-lactic acid methyl ketone and salts of benzylanilin-sulfonic acids,

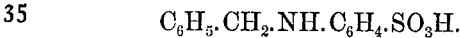

That is to say, it has been found that mixtures of ortho-nitrophenyl-beta-lactic acid methyl ketone with the salts of these sulfonic acids are readily soluble in water. For benzylanilin-sulfonic acids may be substituted their homologues, such as benzyltoluidin-sulfonic acids

or their substitution products, such as chlorobenzylanilin-sulfonic acids

The quantity of benzylanilin (or toluidin) sulfonate requisite for obtaining with a given quantity of ortho-nitrophenyl-beta-lactic-acid methyl ketone a practicable and sufficiently soluble product may be increased, if desired, but is limited to a certain minimum, to be ascertained in every special case. In general, sufficiently soluble products are obtained if about one molecular proportion of benzylanilin (or toluidin) sulfonate is allowed to act on two molecular proportions of ortho-nitrophenyl-beta-lactic acid methyl ketone. The products thus obtained are easily soluble in hot water and absolutely stable. Thus they meet all requirements for the purposes of dyeing and printing indigo. It is not advisable to take less than the above-mentioned minimum quantity of benzyl-anilin-sulfonate. Mixtures thus prepared are still soluble in warm water, but when cold are liable to become turbid, or the ortho-nitrophenyl-beta-lactic acid methyl ketone may separate in crystals.

The homologues of ortho-nitrophenyl-beta-lactic acid methyl ketone, especially ortho-nitrotolyl-beta-lactic acid methyl ketone obtained from the two known ortho-nitrotolylaldehydes, behave similarly toward benzylanilin (or toluidin) sulfonates.

The manufacture of the products described may be illustrated, for instance, as follows: One hundred and twenty-five kilos of ortho-nitrophenyl-beta-lactic acid methyl ketone and one hundred kilos of sodium benzylanilin-sulfonate are pulverized in a ball-mill and thoroughly mixed. The product thus obtained is readily soluble in water. Indigo separates from the aqueous solution on addition of alkalies. In this example may be substituted, first, for ortho-nitrophenyl-beta-lactic acid methyl ketone the equivalent quantity of one of its homologues; second, for the sodium benzylanilin sulfonate another alkali salt of the same acid or the alkali salt of an homologous or substituted benzyl anilin-sulfonic acid or mixture of such salts.

Having now described my invention, what I claim is—.

1. The herein-decribed process for the manufacture of products soluble in water, which consists in mixing ketones, obtained by condensation of ortho-nitrated aromatic aldehydes with acetone, with the salts of sulfonic acids of benzylated aromatic bases, substantially as set forth.

2. The new product obtained by the mixture of ortho-nitrophenyl lacto acid methyl ketone with salts of sulfonic acids of benzylated aromatic bases, which is soluble in water, and the aqueous solution of which yields indigo on addition of alkalies.

In testimony that I claim the foregoing as my invention I have signed my name in presence of two subscribing witnesses.

BENNO HOMOLKA.

Witnesses:
ALFRED BRISBOIS,
JOHANN HARTENSTEIN.